United States Patent
Togashi (10) Patent No.: US 7,411,775 B2
(45) Date of Patent: Aug. 12, 2008

(54) FEEDTHROUGH MULTILAYER CAPACITOR ARRAY

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/524,445

(22) Filed: Sep. 21, 2006

(65) Prior Publication Data

US 2007/0070577 A1 Mar. 29, 2007

(30) Foreign Application Priority Data

Sep. 27, 2005 (JP) .......................... P2005-280451

(51) Int. Cl.
*H01G 4/005* (2006.01)

(52) U.S. Cl. ...................... 361/303; 361/328

(58) Field of Classification Search ................. 361/302, 361/301.2, 301.3, 306.1, 306.2, 306.3, 303, 361/311, 309, 308.1, 328–330

See application file for complete search history.

(56) References Cited

U.S. PATENT DOCUMENTS 5,880,925 A * 3/1999 DuPre et al. ............... 361/303
6,934,145 B2 * 8/2005 Hsieh et al. ............... 361/321.2
7,019,958 B2 * 3/2006 Togashi et al. ............ 361/303
2003/0099083 A1 * 5/2003 Ohtsuka et al. ........... 361/303

FOREIGN PATENT DOCUMENTS

| JP | A 11-097291 | | 4/1999 |
| JP | 2000331879 A | * | 11/2000 |
| JP | A-2002-57066 | | 2/2002 |
| JP | 2004047707 A | * | 2/2004 |

* cited by examiner

*Primary Examiner*—Eric Thomas
(74) *Attorney, Agent, or Firm*—Oliff & Berridge, PLC (57) ABSTRACT

A feedthrough multilayer capacitor array has a multilayer body in which a plurality of first and second electrode layers are alternately laminated with a dielectric layer in between; first, third, fifth, and seventh terminal electrodes formed on a first side face of the multilayer body; and second, fourth, sixth, and eighth terminal electrodes formed on a second side face of the multilayer body facing the first side face. Each first electrode layer includes first and second internal electrodes which are electrically connected through lead conductors respectively to the first and second terminal electrodes, and the third and fourth terminal electrodes. Each second electrode layer includes third and fourth internal electrodes which are electrically connected through lead conductors respectively to the fifth and sixth terminal electrodes, and the seventh and eighth terminal electrodes.

13 Claims, 6 Drawing Sheets

FEEDTHROUGH MULTILAYER CAPACITOR ARRAY

BACKGROUND OF THE INVENTION

1. Field of the Invention

The present invention relates to a feedthrough multilayer capacitor array.

2. Related Background Art

An example of this kind of the known feedthrough multilayer capacitor arrays is a capacitor array in which a plurality of internal electrodes and a plurality of ground electrodes are laminated with a dielectric layer in between so as to form a plurality of capacitors along the laminating direction (e.g., cf. Patent Document 1). In the feedthrough multilayer capacitor array of this type, the plurality of ground electrodes are connected to a single terminal electrode and connected through this terminal electrode to the ground.

[Patent Document 1] Japanese Patent Application Laid-Open No. 11-97291

SUMMARY OF THE INVENTION

However, when the plurality of ground electrodes are connected to one terminal electrode as in the case of the feedthrough multilayer capacitor array described in Patent Document 1, this terminal electrode picks up noise of the other circuits (capacitors) included in the capacitor array. For this reason, crosstalk occurs between the capacitors. With occurrence of crosstalk, it will become difficult for the feedthrough multilayer capacitor array to sufficiently absorb noise.

The present invention has been accomplished in order to solve the above problem and an object of the present invention is to provide a feedthrough multilayer capacitor array capable of sufficiently suppressing crosstalk.

In order to achieve the above object, a feedthrough multilayer capacitor array according to the present invention is a feedthrough multilayer capacitor array comprising: a multilayer body in which a first electrode layer and a second electrode layer are laminated with a dielectric layer in between; and first, second, third, fourth, fifth, sixth, seventh, and eighth terminal electrodes formed on side faces of the multilayer body; wherein the first, third, fifth, and seventh terminal electrodes are located on a first side face of the multilayer body parallel to a laminating direction of the multilayer body, wherein the second, fourth, sixth, and eighth terminal electrodes are located on a second side face of the multilayer body facing the first side face, wherein the first electrode layer includes first and second internal electrodes, and first, second, third, and fourth lead conductors, wherein the second electrode layer includes third and fourth internal electrodes, and fifth, sixth, seventh, and eighth lead conductors, wherein the first internal electrode is electrically connected to the first terminal electrode through the first lead conductor extending so as to be led from the first internal electrode to the first side face and is electrically connected to the second terminal electrode through the second lead conductor extending so as to be led from the first internal electrode to the second side face, wherein the second internal electrode is electrically connected to the third terminal electrode through the third lead conductor extending so as to be led from the second internal electrode to the first side face and is electrically connected to the fourth terminal electrode through the fourth lead conductor extending so as to be led from the second internal electrode to the second side face, wherein the third internal electrode is electrically connected to the fifth terminal electrode through the fifth lead conductor extending so as to be led from the third internal electrode to the first side face and is electrically connected to the sixth terminal electrode through the sixth lead conductor extending so as to be led from the third internal electrode to the second side face, and wherein the fourth internal electrode is electrically connected to the seventh terminal electrode through the seventh lead conductor extending so as to be led from the fourth internal electrode to the first side face and is electrically connected to the eighth terminal electrode through the eighth lead conductor extending so as to be led from the fourth internal electrode to the second side face.

In the feedthrough multilayer capacitor array described above, the first and second internal electrodes included in the first electrode layer are electrically connected to the different terminal electrodes. On the other hand, the third and fourth internal electrodes included in the second electrode layer are electrically connected to the different terminal electrodes. For this reason, either in a case where the internal electrodes included in the first electrode layer are used as ground electrodes or in a case where the internal electrodes included in the second electrode layer are used as ground electrodes, the capacitor array can be mounted on a circuit board or the like without need for the plurality of capacitors to share a ground electrode. Therefore, the capacitor array is able to suppress crosstalk between the capacitors. In the feedthrough multilayer capacitor array the first to eighth terminal electrodes are formed on the first and second side faces of the multilayer body. Since in the foregoing feedthrough multilayer capacitor array the terminal electrodes are formed on the two side faces of the multilayer body as described above, fabrication thereof is easier than fabrication of those in which the terminal electrodes are formed on four side faces.

Preferably, the first lead conductor has a portion not overlapping with any one of the third, fifth, and seventh lead conductors in the laminating direction of the multilayer body, the third lead conductor has a portion not overlapping with any one of the first, fifth, and seventh lead conductors in the laminating direction of the multilayer body, the fifth lead conductor has a portion not overlapping with any one of the first, third, and seventh lead conductors in the laminating direction of the multilayer body, and the seventh lead conductor has a portion not overlapping with any one of the first, third, and fifth lead conductors in the laminating direction of the multilayer body. This configuration is suitable for connecting the first to fourth internal electrodes to their respective different terminal electrodes.

Preferably, the second lead conductor has a portion not overlapping with any one of the fourth, sixth, and eighth lead conductors in the laminating direction of the multilayer body, the fourth lead conductor has a portion not overlapping with any one of the second, sixth, and eighth lead conductors in the laminating direction of the multilayer body, the sixth lead conductor has a portion not overlapping with any one of the second, fourth, and eighth lead conductors in the laminating direction of the multilayer body, and the eighth lead conductor has a portion not overlapping with any one of the second, fourth, and sixth lead conductors in the laminating direction of the multilayer body. This configuration is suitable for connecting the first to fourth internal electrodes to their respective different terminal electrodes.

The capacitor array may be configured as follows: each of the first electrode layer and the second electrode layer comprises a plurality of electrode layers, and the multilayer body is a multilayer body in which the first electrode layers and the second electrode layers are alternately laminated with the dielectric layer in between. This configuration permits the capacitance of each capacitor to be controlled.

In this case, preferably, all the first internal electrodes included in the respective first electrode layers are electrically connected to the same first terminal electrode through the first lead conductors and are electrically connected to the same second terminal electrode through the second lead conductors, wherein all the second internal electrodes included in the respective first electrode layers are electrically connected to the same third terminal electrode through the third lead conductors and are electrically connected to the same fourth terminal electrode through the fourth lead conductors, wherein all the third internal electrodes included in the respective second electrode layers are electrically connected to the same fifth terminal electrode through the fifth lead conductors and are electrically connected to the same sixth terminal electrode through the sixth lead conductors, and wherein all the fourth internal electrodes included in the respective second electrode layers are electrically connected to the same seventh terminal electrode through the seventh lead conductors and are electrically connected to the same eighth terminal electrode through the eighth lead conductors. This configuration is suitable for controlling the capacitance of each capacitor.

The present invention successfully provides the feedthrough multilayer capacitor array capable of sufficiently suppressing crosstalk.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description the same elements or elements with the same functionality will be denoted by the same reference symbols, without redundant description.

First Embodiment

Figure 1:
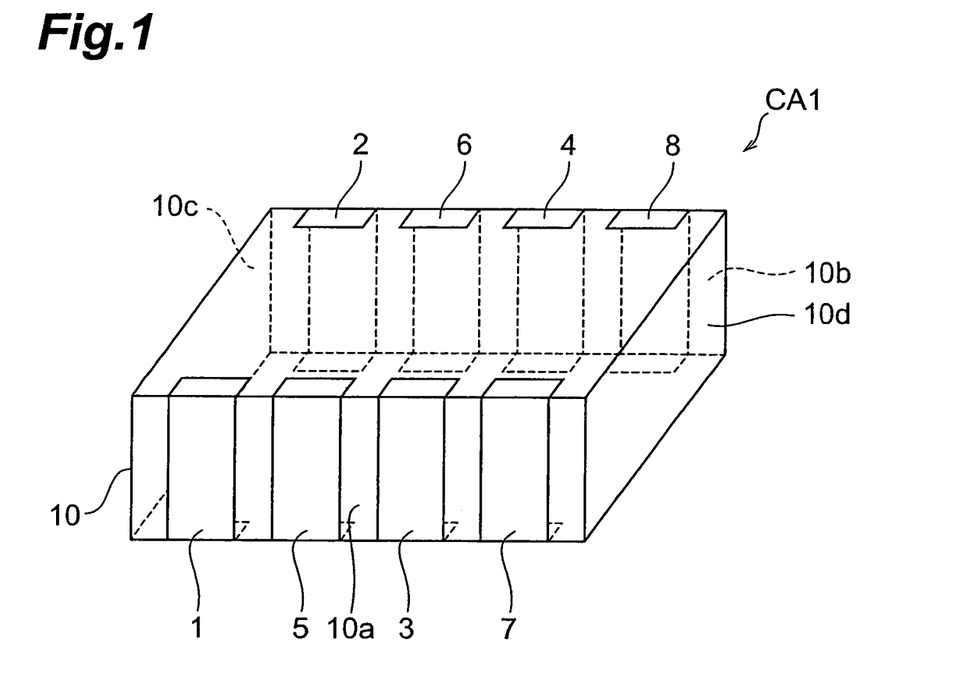
FIG. 1 is a perspective view of a feedthrough multilayer capacitor array according to the first embodiment.
Figure 2:
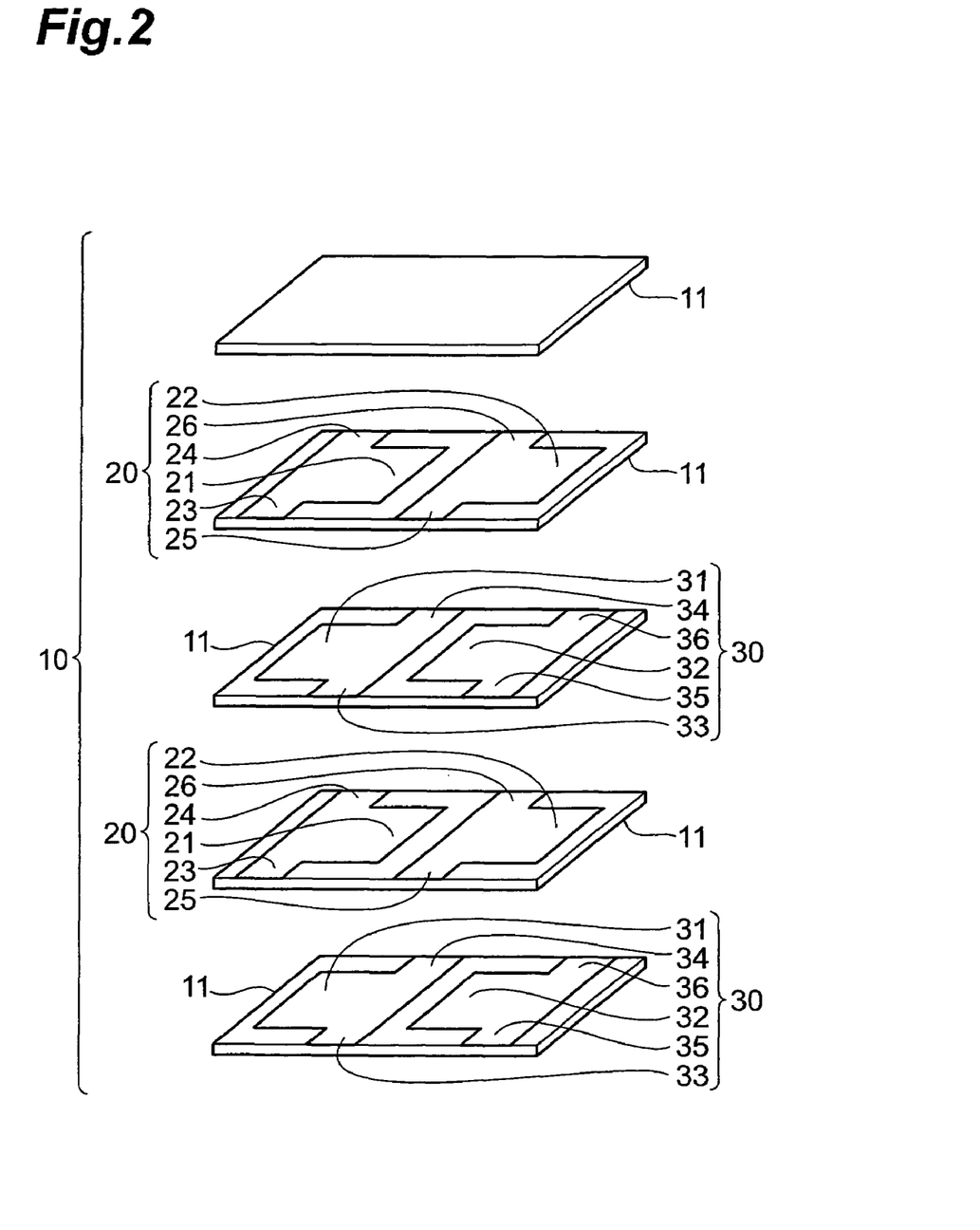
FIG. 2 is an exploded perspective view of a multilayer body included in the feedthrough multilayer capacitor array according to the first embodiment.

A configuration of a feedthrough multilayer capacitor array CA1 according to the first embodiment will be described with reference to FIGS. 1 and 2. FIG. 1 is a perspective view of the feedthrough multilayer capacitor array according to the first embodiment. FIG. 2 is an exploded perspective view of a multilayer body included in the feedthrough multilayer capacitor array according to the first embodiment.

The feedthrough multilayer capacitor array CA1, as shown in FIG. 1, comprises a multilayer body 10 of approximately rectangular parallelepiped shape, and first to eighth terminal electrodes 1-8 formed on the multilayer body 10. The first to eighth terminal electrodes 1-8 are formed on first and second side faces 10a, 10b of the multilayer body 10 facing each other.

The first, third, fifth, and seventh terminal electrodes 1, 3, 5, and 7 are formed on the first side face 10a of multilayer body 10. The first, third, fifth, and seventh terminal electrodes 1, 3, 5, 7 are located in the order of the first, fifth, third, and seventh terminal electrodes 1, 5, 3, and 7 from a third side face 10c toward a fourth side face 10d along the facing direction of the third and fourth side faces 10c, 10d. The third and forth side faces 10c, 10d are parallel to the laminating direction of the multilayer body 10 and face each other in the multilayer body 10.

The second, fourth, sixth, and eighth terminal electrodes 2, 4, 6, and 8 are formed on the second side face 10b of the multilayer body 10. The second, fourth, sixth, and eighth terminal electrodes 2, 4, 6, 8 are located in the order of the second, sixth, fourth, and eighth terminal electrodes 2, 6, 4, and 8 from the third side face 10c toward the fourth side face 10d along the facing direction of the third and fourth side faces 10c, 10d of the multilayer body 10.

The multilayer body 10, as shown in FIG. 2, is constructed in a configuration in which a plurality of first and second electrode layers 20, 30 (two layers each in the present embodiment) are alternately laminated with a plurality of dielectric layers 11 (five layers in the present embodiment). In practical feedthrough multilayer capacitor array CA1, the layers are integrated so that no border can be visually recognized between the dielectric layers 11.

Each first electrode layer 20, as shown in FIG. 2, includes a first internal electrode 21 and a second internal electrode 22. Each of the first electrode layers 20 further includes a first lead conductor 23 extending so as to be led from the corresponding first internal electrode 21 to the first side face 10a, and a second lead conductor 24 extending so as to be led from the corresponding first internal electrode 21 to the second side face 10b. Each of the first electrode layers 20 further includes a third lead conductor 25 extending so as to be led from the corresponding second internal electrode 22 to the first side face 10a, and a fourth lead conductor 26 extending so as to be led from the corresponding second internal electrode 22 to the second side face 10b.

Each of the first and second internal electrodes 21, 22 is of rectangular shape. The first and second internal electrodes 21, 22 of rectangular shape in each of the first electrode layers 20 are located in the order named in the direction directed from the third side face 10c to the fourth side face 10d of the multilayer body 10. The first and second internal electrodes 21, 22 are located so as not to contact each other.

The first internal electrodes 21 are electrically connected to the first terminal electrode 1 through the first lead conductors 23. The first internal electrodes 21 are electrically connected to the second terminal electrode 2 through the second lead conductors 24.

The second internal electrodes 22 are electrically connected to the third terminal electrode 3 through the third lead conductors 25. The second internal electrodes 22 are electrically connected to the fourth terminal electrode 4 through the fourth lead conductors 26.

All the first internal electrodes 21 included in the respective first electrode layers 20 are electrically connected to the same first terminal electrode 1 through the first lead conductors 23. All the first internal electrodes 21 included in the respective first electrode layers 20 are electrically connected to the same second terminal electrode 2 through the second lead conductors 24.

All the second internal electrodes 22 included in the respective first electrode layers 20 are electrically connected to the same third terminal electrode 3 through the third lead conductors 25. All the second internal electrodes 22 included in the respective first electrode layers 20 are electrically connected to the same fourth terminal electrode 4 through the fourth lead conductors 26.

Each of the first internal electrodes 21, together with the corresponding first and second lead conductors 23, 24, continuously covers a region crossing over from the first side face 10a to the second side face 10b of the multilayer body 10. Therefore, each of the first internal electrodes 21, together with the corresponding first and second lead conductors 23, 24, penetrates the interior of the multilayer body 10 from the first side face 10a to the second side face 10b.

Each of the second internal electrodes 22, together with the corresponding third and fourth lead conductors 25, 26, continuously covers a region crossing over from the first side face 10a to the second side face 10b of the multilayer body 10. Therefore, each of the second internal electrodes 22, together with the corresponding third and fourth lead conductors 25, 26, penetrates the interior of the multilayer body 10 from the first side face 10a to the second side face 10b.

Each second electrode layer 30, as shown in FIG. 2, includes a third internal electrode 31 and a fourth internal electrode 32. Each of the second electrode layers 30 further includes a fifth lead conductor 33 extending so as to be led from the corresponding third internal electrode 31 to the first side face 10a, and a sixth lead conductor 34 extending so as to be led from the corresponding third internal electrode 31 to the second side face 10b. Each of the second electrode layers 30 further includes a seventh lead conductor 35 extending so as to be led from the corresponding fourth internal electrode 32 to the first side face 10a, and an eighth lead conductor 36 extending so as to be led from the corresponding fourth internal electrode 32 to the second side face 10b.

Each of the third and fourth internal electrodes 31, 32 is of rectangular shape. The third and fourth internal electrodes 31, 32 of rectangular shape in each of the second electrode layers 30 are located in the order named in the direction directed from the third side face 10c to the fourth side face 10d of the multilayer body 10. The third and fourth internal electrodes 31, 32 are located so as not to contact each other.

The third internal electrodes 31 are electrically connected to the fifth terminal electrode 5 through the fifth lead conductors 33. The third internal electrodes 31 are electrically connected to the sixth terminal electrode 6 through the sixth lead conductors 34.

The fourth internal electrodes 32 are electrically connected to the seventh terminal electrode 7 through the seventh lead conductors 35. The fourth internal electrodes 32 are electrically connected to the eighth terminal electrode 8 through the eighth lead conductors 36.

All the third internal electrodes 31 included in the respective second electrode layers 30 are electrically connected to the same fifth terminal electrode 5 through the fifth lead conductors 33. All the third internal electrodes 31 included in the respective second electrode layers 30 are electrically connected to the same sixth terminal electrode 6 through the sixth lead conductors 34.

All the fourth internal electrodes 32 included in the respective second electrode layers 30 are electrically connected to the same seventh terminal electrode 7 through the seventh lead conductors 35. All the fourth internal electrodes 32 included in the respective second electrode layers 30 are electrically connected to the same eighth terminal electrode 8 through the eighth lead conductors 36.

Each of the third internal electrodes 31, together with the corresponding fifth and sixth lead conductors 33, 34, continuously covers a region crossing over from the first side face 10a to the second side face 10b of the multilayer body 10. Therefore, each of the third internal electrodes 31, together with the corresponding fifth and sixth lead conductors 33, 34, penetrates the interior of the multilayer body 10 from the first side face 10a to the second side face 10b.

Each of the fourth internal electrodes 32, together with the corresponding seventh and eighth lead conductors 35, 36, continuously covers a region crossing over from the first side face 10a to the second side face 10b of the multilayer body 10. Therefore, each of the fourth internal electrodes 32, together with the corresponding seventh and eighth lead conductors 35, 36, penetrates the interior of the multilayer body 10 from the first side face 10a to the second side face 10b.

Each of the first lead conductors 23 does not overlap with any one of the third, fifth, and seventh lead conductors 25, 33, and 35 in the laminating direction of the multilayer body 10. Namely, each of the first lead conductors 23 has a portion not overlapping with any one of the third, fifth, and seventh lead conductors in the laminating direction of the multilayer body 10.

Each of the third lead conductors 25 does not overlap with any one of the first, fifth, and seventh lead conductors 23, 33, and 35 in the laminating direction of the multilayer body 10. Namely, each of the third lead conductors 25 has a portion not overlapping with any one of at least the first, fifth, and seventh lead conductors 23, 33, and 35 in the laminating direction of the multilayer body.

Each of the fifth lead conductors 33 does not overlap with any one of the first, third, and seventh lead conductors 23, 25, and 35 in the laminating direction of the multilayer body 10. Namely, each of the fifth lead conductors 33 has a portion not overlapping with any one of the first, third, and seventh lead conductors 23, 25, and 35 in the laminating direction of the multilayer body 10.

Each of the seventh lead conductors 35 does not overlap with any one of the first, third, and fifth lead conductors 23, 25, and 33 in the laminating direction of the multilayer body 10. Namely, each of the seventh lead conductors 35 has a portion not overlapping with any one of the first, third, and fifth lead conductors 23, 25, and 33 in the laminating direction of the multilayer body 10.

Figure 3:
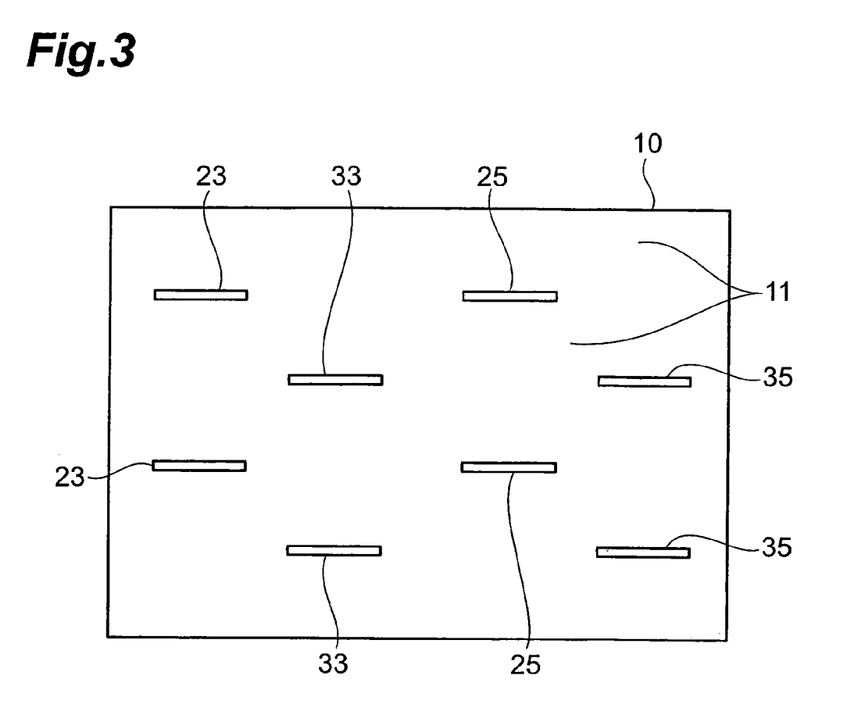
FIG. 3 is a plan view of a first side face of the multilayer body included in the feedthrough multilayer capacitor array according to the first embodiment.

FIG. 3 shows a plan view of the first side face 10a of the multilayer body 10. It is understood from FIG. 3 that the first, third, fifth, and seventh lead conductors 23, 25, 33, and 35 extend so as to be led to the first side face 10a. It is also understood from FIG. 3 that each of the first, third, fifth, and seventh lead conductors 23, 25, 33, and 35 does not overlap with any other lead conductor in the laminating direction of the multilayer body 10.

Each of the second lead conductors 24 does not overlap with any one of the fourth, sixth, and eighth lead conductors 26, 34, 36 in the laminating direction of the multilayer body 10. Namely, each of the second lead conductors 24 has a portion not overlapping with any one of the fourth, sixth, and eighth lead conductors 26, 34, and 36 in the laminating direction of the multilayer body 10.

Each of the fourth lead conductor 26 does not overlap with any one of the second, sixth, and eighth lead conductors 24, 34, and 36 in the laminating direction of the multilayer body 10. Namely, each of the fourth lead conductors 26 has a portion not overlapping with any one of the second, sixth, and eighth lead conductors 24, 34, and 36 in the laminating direction of the multilayer body 10.

Each of the sixth lead conductors 34 does not overlap with any one of the second, fourth, and eighth lead conductors 24, 26, and 36 in the laminating direction of the multilayer body 10. Namely, each of the sixth lead conductors 34 has a portion not overlapping with any one of the second, fourth, and eighth lead conductors 24, 26, and 36 in the laminating direction of the multilayer body 10.

Each of the eighth lead conductors 36 does not overlap with any one of the second, fourth, and sixth lead conductors 24, 26, and 34 in the laminating direction of the multilayer body 10. Namely, each of the eighth lead conductors 36 has a portion not overlapping with any one of the second, fourth, and sixth lead conductors 24, 26, and 34 in the laminating direction of the multilayer body 10.

Figure 4:
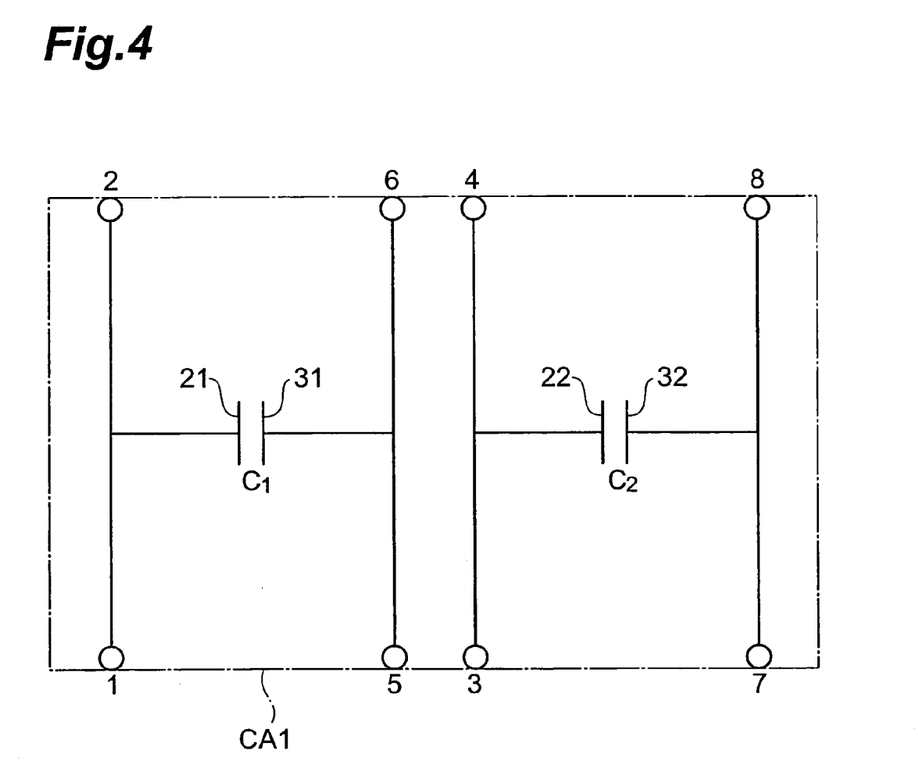
FIG. 4 is an equivalent circuit schematic of the feedthrough multilayer capacitor array according to the first embodiment.

FIG. 4 shows an equivalent circuit schematic of the feedthrough multilayer capacitor array CA1. In the feedthrough multilayer capacitor array CA1 which comprises capacitors C1 and C2, the capacitor C1 includes the first internal electrodes 21 and the third internal electrodes 31, and the capacitor C2 includes the second internal electrodes 22 and the fourth internal electrodes 32.

The first internal electrode 21 included in each first electrode layer 20 is electrically connected to the first and second terminal electrodes 1, 2. The second internal electrode 22 included in each first electrode layer 20 is electrically connected to the third and fourth terminal electrodes 3, 4. On the other hand, the third internal electrode 31 included in each second electrode layer 30 is electrically connected to the fifth and sixth terminal electrodes 5, 6. The fourth internal electrode 32 included in each second electrode layer 30 is electrically connected to the seventh and eighth terminal electrodes 7, 8.

In the feedthrough multilayer capacitor array CA1, as described above, the first and second internal electrodes 21, 22 included in each first electrode layer 20 are electrically connected to their respective different terminal electrodes. On the other hand, the third and fourth internal electrodes 31, 32 included in the second electrode layer 30 are electrically connected to their respective different terminal electrodes. For this reason, either in a case where the first and second internal electrodes 21, 22 included in the first electrode layers 20 are used as ground electrodes while the first to fourth terminal electrodes 1-4 are connected to the ground, or in a case where the third and fourth internal electrodes 31, 32 included in the second electrode layers 30 are used as ground electrodes while the fifth to eighth terminal electrodes 5-8 are connected to the ground, the capacitor array can be mounted on a circuit board or the like in a configuration in which the plurality of capacitors $C_1$, $C_2$ do not share any ground electrode. Therefore, the feedthrough multilayer capacitor array CA1 is able to suppress crosstalk between the capacitors $C_1$, $C_2$.

In the feedthrough multilayer capacitor array CA1, the first to eighth terminal electrodes 1-8 are formed on the two side faces of the multilayer body 10, i.e., on the first and second side faces 10a, 10b. Therefore, fabrication of the feedthrough multilayer capacitor array CA1 becomes easier than fabrication of those in which the terminal electrodes 1-8 are formed on four side faces.

In the feedthrough multilayer capacitor array CA1, as shown in FIG. 3, the lead conductors located at the same position in the laminating direction of the multilayer body 10 do not adjoin in the facing direction of the third side face 10c and the fourth side face 10d of the multilayer body 10. Namely, the lead conductors located at the same position in the laminating direction of the multilayer body 10 are so arranged that another lead conductor located at a different position in the laminating direction is interposed between them in the facing direction of the third side face 10c and the fourth side face 10d of the multilayer body 10. For this reason, crosstalk is suitably suppressed between the lead conductors.

Second Embodiment

Figure 5:
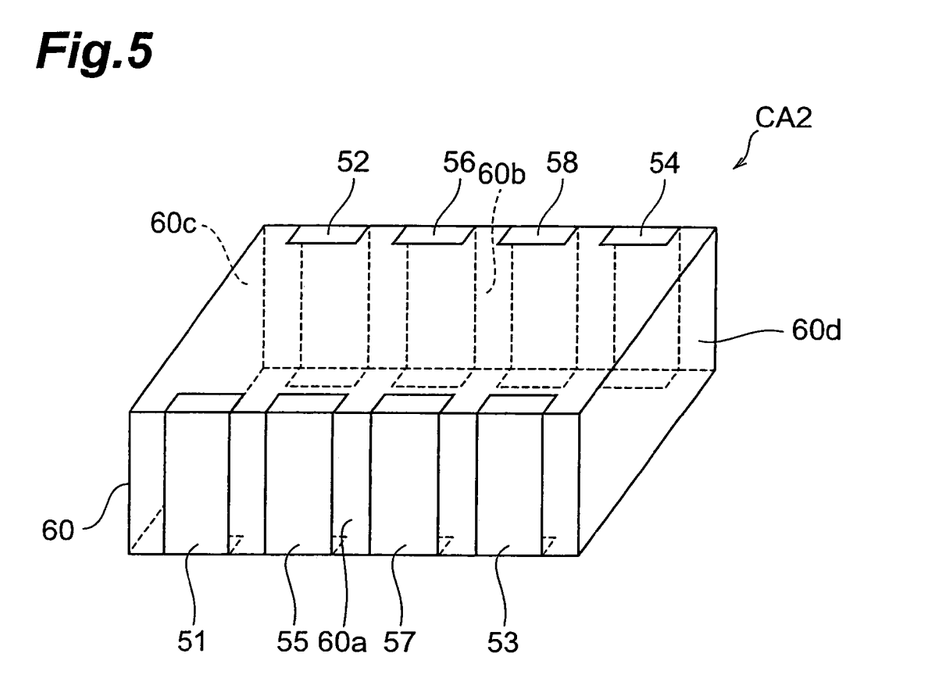
FIG. 5 is a perspective view of a feedthrough multilayer capacitor array according to the second embodiment.
Figure 6:
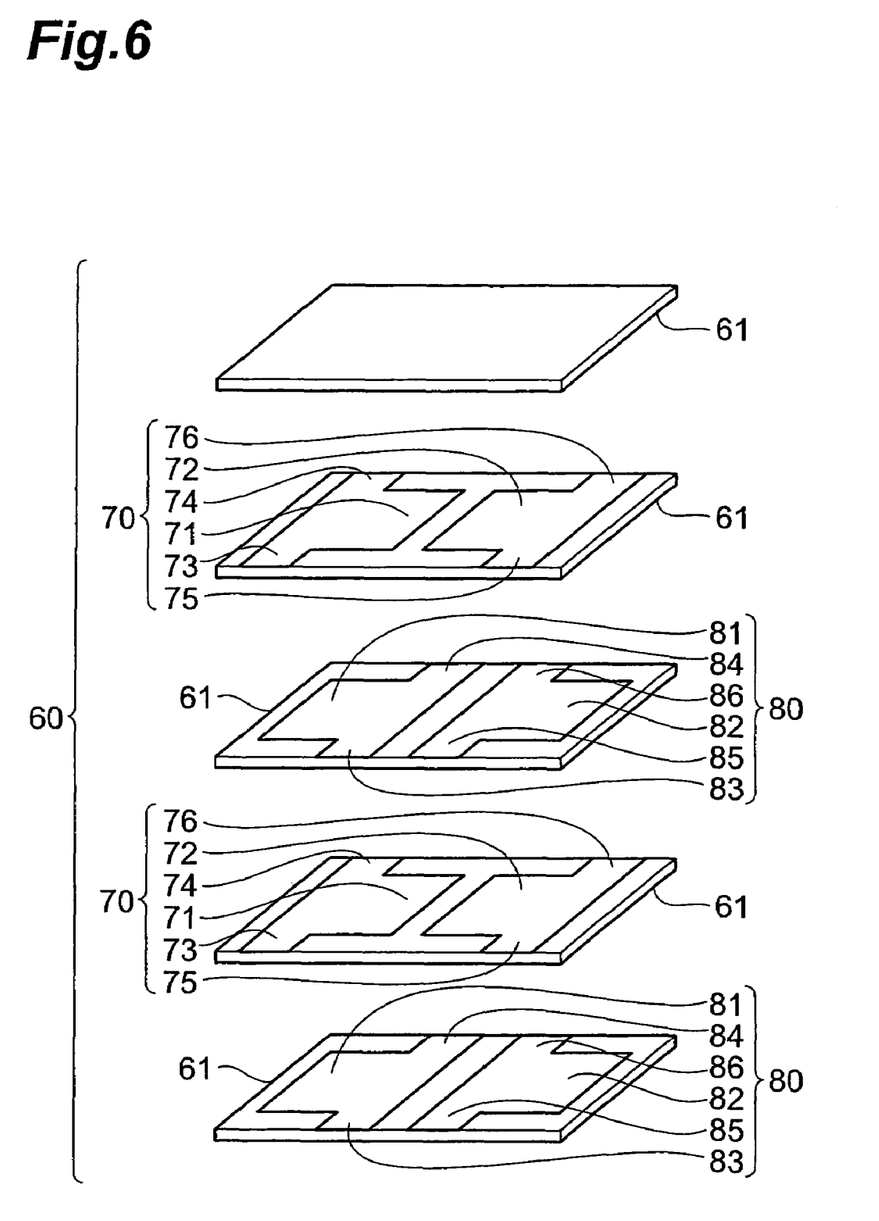
FIG. 6 is an exploded perspective view of a multilayer body included in the feedthrough multilayer capacitor array according to the second embodiment.

A configuration of a feedthrough multilayer capacitor array CA2 according to the second embodiment will be described with reference to FIGS. 5 and 6. The feedthrough multilayer capacitor array CA2 according to the second embodiment is different in arrangement of the third, fourth, seventh, and eighth terminal electrodes from the feedthrough multilayer capacitor array CA1 according to the first embodiment. FIG. 5 is a perspective view of the feedthrough multilayer capacitor array according to the second embodiment. FIG. 6 is an exploded perspective view of the multilayer body included in the feedthrough multilayer capacitor array according to the second embodiment.

The feedthrough multilayer capacitor array CA2, as shown in FIG. 5, comprises a multilayer body 60 of approximately rectangular parallelepiped shape, and first to eighth terminal electrodes 51-58 formed on the multilayer body 60.

The first, third, fifth, and seventh terminal electrodes 51, 53, 55, and 57 are formed on the first side face 60a of the multilayer body 60 parallel to the laminating direction of the multilayer body 60. The first, third, fifth, and seventh terminal electrodes 51, 53, 55, and 57 are located in the order of the first, fifth, seventh, and third terminal electrodes 51, 55, 57, and 53 from the third side face 60c toward the fourth side face 60d along the facing direction of the third and fourth side faces 60c, 60d. The third and forth side faces 60c, 60d are parallel to the laminating direction of the multilayer body 60 and face each other in the multilayer body 60.

The second, fourth, sixth, and eighth terminal electrodes 52, 54, 56, and 58 are formed on the second side face 60b of the multilayer body 60 facing the first side face 60a. The second, fourth, sixth, and eighth terminal electrodes 52, 54, 56, 58 are located in the order of the second, sixth, eighth, and fourth terminal electrodes 52, 56, 58, and 54 from the third side face 60c to the fourth side face 60d along the facing direction of the third and fourth side faces 60c, 60d of the multilayer body 60.

The multilayer body 60, as shown in FIG. 6, is constructed in a configuration in which a plurality of dielectric layers 61 (five layers in the present embodiment) and a plurality of first and second electrode layers 70, 80 (two layers each in the present embodiment) are alternately laminated. In practical feedthrough multilayer capacitor array CA2, the layers are integrated so that no border can be visually recognized between the dielectric layers 61.

Each first electrode layer 70, as shown in FIG. 6, includes a first internal electrode 71 and a second internal electrode 72. Each of the first electrode layers 70 further includes a first lead conductor 73 extending so as to be led from the corresponding first internal electrode 71 to the first side face 60*a*, and a second lead conductor 74 extending so as to be led from the corresponding first internal electrode 71 to the second side face 60*b*. Each of the first electrode layers 70 further includes a third lead conductor 75 extending so as to be led from the corresponding second internal electrode 72 to the first side face 60*a*, and a fourth lead conductor 76 extending so as to be led from the second internal electrode 72 to the corresponding second side face 60*b*.

The first and second internal electrodes 71, 72 of rectangular shape in each of the first electrode layers 70 are located in the order named in the direction directed from the third side face 60*c* to the fourth side face 60*d* of the multilayer body 60.

The first internal electrodes 71 are electrically connected to the first terminal electrode 51 through the first lead conductor 73 and to the second terminal electrode 52 through the second lead conductors 74. The second internal electrodes 72 are electrically connected to the third terminal electrode 53 through the third lead conductor 75 and to the fourth terminal electrode 54 through the fourth lead conductors 76.

All the first internal electrodes 71 included in the respective first electrode layers 70 are electrically connected to the same first terminal electrode 51 through the first lead conductors 73 and to the same second terminal electrode 52 through the second lead conductors 74. Each of the first internal electrodes 71, together with the corresponding first and second lead conductors 73, 74, penetrates the interior of the multilayer body 60 from the first side face 60*a* to the second side face 60*b*.

All the second internal electrodes 72 included in the respective first electrode layers 70 are electrically connected to the same third terminal electrode 53 through the third lead conductors 75 and to the same fourth terminal electrode 54 through the fourth lead conductors 76. Each of the second internal electrodes 72, together with the corresponding third and fourth lead conductors 75, 76, penetrates the interior of the multilayer body 60 from the first side face 60*a* to the second side face 60*b*.

Each second electrode layer 80, as shown in FIG. 6, includes a third internal electrode 81 and a fourth internal electrode 82. Each of the second electrode layers 80 further includes a fifth lead conductor 83 extending so as to be led from the corresponding third internal electrode 81 to the first side face 60*a*, and a sixth lead conductor 84 extending so as to be led from the corresponding third internal electrode 81 to the second side face 60*b*. Each of the second electrode layers 80 further includes a seventh lead conductor 85 extending so as to be led from the corresponding fourth internal electrode 82 to the first side face 60*a*, and an eighth lead conductor 86 extending so as to be led from the corresponding fourth internal electrode 82 to the second side face 60*b*.

The third and fourth internal electrodes 81, 82 of rectangular shape in each of the second electrode layers 80 are located in the order named in the direction directed from the third side face 60*c* to the fourth side face 60*d* of the multilayer body 60.

The third internal electrodes 81 are electrically connected to the fifth terminal electrode 55 through the fifth lead conductors 83 and to the sixth terminal electrode 56 through the sixth lead conductors 84. The fourth internal electrodes 82 are electrically connected to the seventh terminal electrode 57 through the seventh lead conductors 85 and to the eighth terminal electrode 58 through the eighth lead conductors 86.

All the third internal electrodes 81 included in the respective second electrode layers 80 are electrically connected to the same fifth terminal electrode 55 through the fifth lead conductors 83 and to the same sixth terminal electrode 56 through the sixth lead conductors 84. Each of the third internal electrodes 81, together with the corresponding fifth and sixth lead conductors 83, 84, penetrates the interior of the multilayer body 60 from the first side face 60*a* to the second side face 60*b*.

All the fourth internal electrodes 82 included in the respective second electrode layers 80 are electrically connected to the same seventh terminal electrode 57 through the seventh lead conductors 85 and to the same eighth terminal electrode 58 through the eighth lead conductors 86. Each of the fourth internal electrodes 82, together with the corresponding seventh and eighth lead conductors 85, 86, penetrates the interior of the multilayer body 60 from the first side face 60*a* to the second side face 60*b*.

Each of the first, third, fifth, and seventh lead conductors 73, 75, 83, and 85 does not overlap with another terminal electrode in the laminating direction of the multilayer body 60. Each of the second, fourth, sixth, and eighth lead conductors 74, 76, 84, and 86 does not overlap with another terminal electrode in the laminating direction of the multilayer body 60.

In the feedthrough multilayer capacitor array CA2, as described above, the first and second internal electrodes 71, 72 included in each first electrode layer 70 are electrically connected to their respective different terminal electrodes. On the other hand, the third and fourth internal electrodes 81, 82 included in each second electrode layer 80 are electrically connected to their respective different terminal electrodes. For this reason, either in a case where the first and second internal electrodes 71, 72 included in the first electrode layers 70 are used as ground electrodes or in a case where the third and fourth internal electrodes 81, 82 included in the second electrode layers 80 are used as ground electrodes, the capacitor array can be mounted on a circuit board or the like in a configuration in which the plurality of capacitors do not share any ground electrode. Therefore, the feedthrough multilayer capacitor array CA2 is able to suppress crosstalk between the capacitors.

In the feedthrough multilayer capacitor array CA2, the first to eighth terminal electrodes 51-58 are formed on the two side faces of the multilayer body 60, i.e., on the first and second side faces 60*a*, 60*b*. Therefore, fabrication of the feedthrough multilayer capacitor array CA2 is easier than fabrication of those in which the terminal electrodes 51-58 are formed on four side faces.

The preferred embodiments of the present invention were described above in detail, but it is noted that the present invention is by no means limited to the above embodiments and modification examples thereof. For example, the number of laminated dielectric layers 11, 61 and the number of the respective laminated first and second electrode layers 20, 70, 30, 80 are not limited to the numbers described in the foregoing embodiments. Therefore, each of the first and second electrode layers included in the multilayer body may be, for example, one layer, or may be three or more layers.

The number of first and second internal electrodes included in the first electrode layer is not limited to the number described in the foregoing embodiments. The number of third and fourth internal electrodes included in the second electrode layer is not limited to the number described in the foregoing embodiments.

The number of first internal electrodes and the number of second internal electrodes in the first electrode layer may be different from each other. The number of third internal electrodes and the number of fourth internal electrodes in the second electrode layer may be different from each other. The shape of the first to fourth internal electrodes is not limited to the rectangular shape described in the above embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A feedthrough multilayer capacitor array comprising: a multilayer body in which a first electrode layer and a second electrode layer are laminated with a dielectric layer in between; and first, second, third, fourth, fifth, sixth, seventh, and eighth terminal electrodes formed on side faces of the multilayer body;
    wherein the first, third, fifth, and seventh terminal electrodes are located on a first side face of the multilayer body parallel to a laminating direction of the multilayer body,
    wherein the second, fourth, sixth, and eighth terminal electrodes are located on a second side face of the multilayer body facing the first side face,
    wherein the first electrode layer includes first and second internal electrodes, and first, second, third, and fourth lead conductors,
    wherein the second electrode layer includes third and fourth internal electrodes, and fifth, sixth, seventh, and eighth lead conductors,
    wherein the first internal electrode is electrically connected to the first terminal electrode through the first lead conductor extending so as to be led from the first internal electrode to the first side face and is electrically connected to the second terminal electrode through the second lead conductor extending so as to be led from the first internal electrode to the second side face,
    wherein the second internal electrode is electrically connected to the third terminal electrode through the third lead conductor extending so as to be led from the second internal electrode to the first side face and is electrically connected to the fourth terminal electrode through the fourth lead conductor extending so as to be led from the second internal electrode to the second side face,
    wherein the third internal electrode is electrically connected to the fifth terminal electrode through the fifth lead conductor extending so as to be led from the third internal electrode to the first side face and is electrically connected to the sixth terminal electrode through the sixth lead conductor extending so as to be led from the third internal electrode to the second side face, and
    wherein the fourth internal electrode is electrically connected to the seventh terminal electrode through the seventh lead conductor extending so as to be led from the fourth internal electrode to the first side face and is electrically connected to the eighth terminal electrode through the eighth lead conductor extending so as to be led from the fourth internal electrode to the second face,
    wherein the feedthrough multilayer capacitor array comprises two capacitors one of which includes the first internal electrode and the third internal electrode, and the other of which includes the second internal electrode and the fourth internal electrode, and
    wherein the two capacitors do not share any internal electrodes, and
    wherein the first to eighth terminal electrodes each have a portion which is disposed on a same one of side faces of the multilayer body that is formed along a plane that is substantially normal to the laminating direction.

2. The feedthrough multilayer capacitor array according to claim 1,
    wherein the first lead conductor has a portion not overlapping with any one of the third, fifth, and seventh lead conductors in the laminating direction of the multilayer body,
    wherein the first lead conductor has a portion not overlapping with any one of the first, fifth, and seventh lead conductors in the laminating direction of the multilayer body,
    wherein the fifth lead conductor has a portion not overlapping with any one of the first, third, and seventh lead conductors in the laminating direction of the multilayer body, and
    wherein the seventh lead conductor has a portion not overlapping with any one of the first, third, and fifth lead conductors in the laminating direction of the multilayer body.

3. The feedthrough multilayer capacitor array according to claim 1, wherein the second lead conductor has a portion not overlapping with any one of the fourth, sixth, and eighth lead conductors in the laminating direction of the multilayer body,
    wherein the fourth lead conductor has a portion not overlapping with any one of the second, sixth, and eighth lead conductors in the laminating direction of the multilayer body,
    wherein the sixth lead conductor has a portion not overlapping with any one of the second, fourth, and eighth lead conductors in the laminating direction of the multilayer body, and
    wherein the eighth lead conductor has a portion not overlapping with any one of the second, fourth, and sixth lead conductors in the laminating direction of the multilayer body.

4. The feedthrough multilayer capacitor array according to claim 1, wherein each of the first electrode layer and the second electrode layer comprises a plurality of electrode layers, and
    wherein the multilayer body is a multilayer body in which the first electrode layers and the second electrode layers are alternately laminated with the dielectric layer in between.

5. The feedthrough multilayer capacitor array according to claim 4,
    wherein all the first internal electrodes included in the respective first electrode layers are electrically connected to the same first terminal electrode through the first lead conductors and are electrically connected to the same second terminal electrode through the second lead conductors,
    wherein all the second internal electrodes included in the respective first electrode layers are electrically connected to the same third terminal electrode through the third lead conductors and are electrically connected to the same fourth terminal electrode through the fourth lead conductors,
    wherein all the third internal electrodes included in the respective second electrode layers are electrically connected to the same fifth terminal electrode through the fifth lead conductors and are electrically connected to the same sixth terminal electrode through the sixth lead conductors, and wherein all the fourth internal electrodes included in the respective second electrode layers are electrically connected to the same seventh terminal electrode through the seventh lead conductors and are electrically connected to the same eighth terminal electrode through the eighth lead conductors.

6. The feedthrough multilayer capacitor array according to claim 1,
wherein the first internal electrode opposes only the third internal electrode, and
wherein the second internal electrode opposes only the fourth internal electrode.

7. A mounted structure in which a feedthrough multilayer capacitor array is mounted on a circuit substrate, the feedthrough multilayer capacitor array comprising:
a multilayer body in which a first electrode layer and a second electrode layer are laminated with a dielectric layer in between; and first, second, third, fourth, fifth, sixth, seventh, and eighth terminal electrodes formed on side faces of the multilayer body;
wherein the first, third, fifth, and seventh terminal electrodes are located on a first side face of the multilayer body parallel to a laminating direction of the multilayer body,
wherein the second, fourth, sixth and eighth terminal electrodes are located on a second side face of the multilayer body facing the first side face,
wherein the first electrode layer includes first and second internal electrodes, and first, second, third, and fourth lead conductors,
wherein the second electrode layer includes third and fourth internal electrodes, and fifth, sixth, seventh, and eighth lead conductors,
wherein the first internal electrode is electrically connected to the first terminal electrode through the first lead conductor extending so as to be led from the first internal electrode to the first side face and is electrically connected to the second terminal electrode through the second lead conductor extending so as to be led from the first internal electrode to the second side face,
wherein the second internal electrode is electrically connected to the third terminal electrode through the third lead conductor extending so as to be led from the second internal electrode to the first side face and is electrically connected to the fourth terminal electrode through the fourth lead conductor extending so as to be led from the second internal electrode to the second side face,
wherein the third internal electrode is electrically connected to the fifth terminal electrode through the fifth lead conductor extending so as to be led from the third internal electrode to the first side face and is electrically connected to the sixth terminal electrode through the sixth lead conductor extending so as to be led from the third internal electrode to the second side face, and
wherein the fourth internal electrode is electrically connected to the seventh terminal electrode through the seventh lead conductor extending so as to be led from the fourth internal electrode to the first side face and is electrically connected to the eighth terminal electrode through the eighth lead conductor extending so as to be led from the fourth internal electrode to the second side face,
wherein the feedthrough multilayer capacitor array comprises two capacitors one of which includes the first internal electrode and the third internal electrode, and the other of which includes the second internal electrode and the fourth internal electrode,
wherein the two capacitors do not share any internal electrodes,
wherein the first to eighth terminal electrodes each have a portion which is disposed on a same one of side faces of the multilayer body that is formed along a plane that is substantially normal to the laminating direction,
wherein the feedthrough multilayer capacitor array is mounted on the circuit substrate such that the side face on which the portions of the first to eighth terminal electrodes are disposed opposes the circuit substrate.

8. The mounted structure of the feedthrough multilayer capacitor array according to claim 7, wherein the first to fourth terminal electrodes are connected to the ground.

9. The mounted structure according to claim 7,
wherein the first lead conductor has a portion not overlapping with any one of the third, fifth, and seventh lead conductors in the laminating direction of the multilayer body,
wherein the third lead conductor has a portion not overlapping with any one of the first, fifth, and seventh lead conductors in the laminating direction of the multilayer body,
wherein the fifth lead conductor has a portion not overlapping with any one of the first, third, and seventh lead conductors in the laminating direction of the multilayer body, and
wherein the seventh lead conductor has a portion not overlapping with any one of the first, third, and fifth lead conductors in the laminating direction of the multilayer body.

10. The mounted structure according to claim 7,
wherein the second lead conductor has a portion not overlapping with any one of the fourth, sixth, and eighth lead conductors in the laminating direction of the multilayer body,
wherein the fourth lead conductor has a portion not overlapping with any one of the second, sixth, and eighth lead conductors in the laminating direction of the multilayer body,
wherein the sixth lead conductor has a portion not overlapping with any one of the second, fourth, and eighth lead conductors in the laminating direction of the multilayer body, and
wherein the eighth lead conductor has a portion not overlapping with any one of the second, fourth, and sixth lead conductors in the laminating direction of the multilayer body.

11. The mounted structure according to claim 7,
wherein each of the first electrode layer and the second electrode layer comprises a plurality of electrode layers, and
wherein the multilayer body is a multilayer body in which the first electrode layers and the second electrode layers are alternately laminated with the dielectric layer in between.

12. The mounted structure according to claim 11,
wherein all the first internal electrodes included in the respective first electrode layers are electrically connected to the same first terminal electrode through the first lead conductors and are electrically connected to the same second terminal electrode through the second lead conductors,
wherein all the second internal electrodes included in the respective first electrode layers are electrically connected to the same third terminal electrode through the third lead conductors and are electrically connected to the same fourth terminal electrode through the fourth lead conductors, wherein all the third internal electrodes included in the respective second electrode layers are electrically connected to the same fifth terminal electrode through the fifth lead conductors and are electrically connected to the same sixth terminal electrode through the sixth lead conductors, and wherein all the fourth internal electrodes included in the respective second electrode layers are electrically connected to the same seventh terminal electrode through the seventh lead conductors and are electrically connected to the same eighth terminal electrode through the eighth lead conductors.

13. The mounted structure according to claim 7, wherein the first internal electrode opposes only the third internal electrode, and wherein the second internal electrode opposes only the fourth internal electrode.

* * * * *